Oct. 28, 1958     H. J. M. FÖRSTER ET AL     2,857,976
STEERING SERVO MECHANISM, PARTICULARLY FOR MOTOR VEHICLES
Filed Jan. 26, 1954
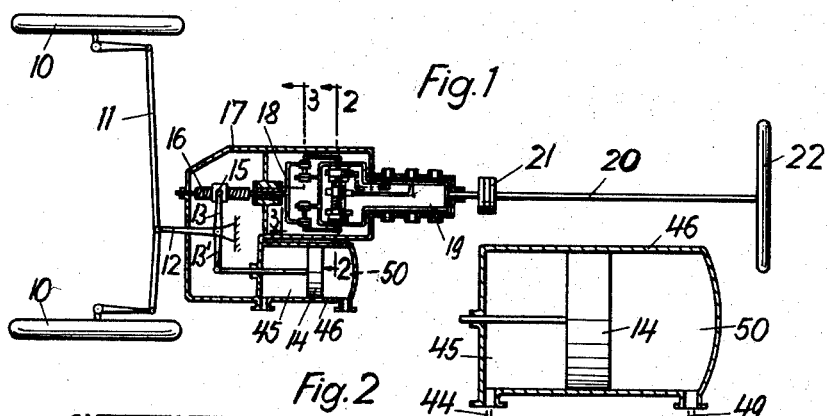
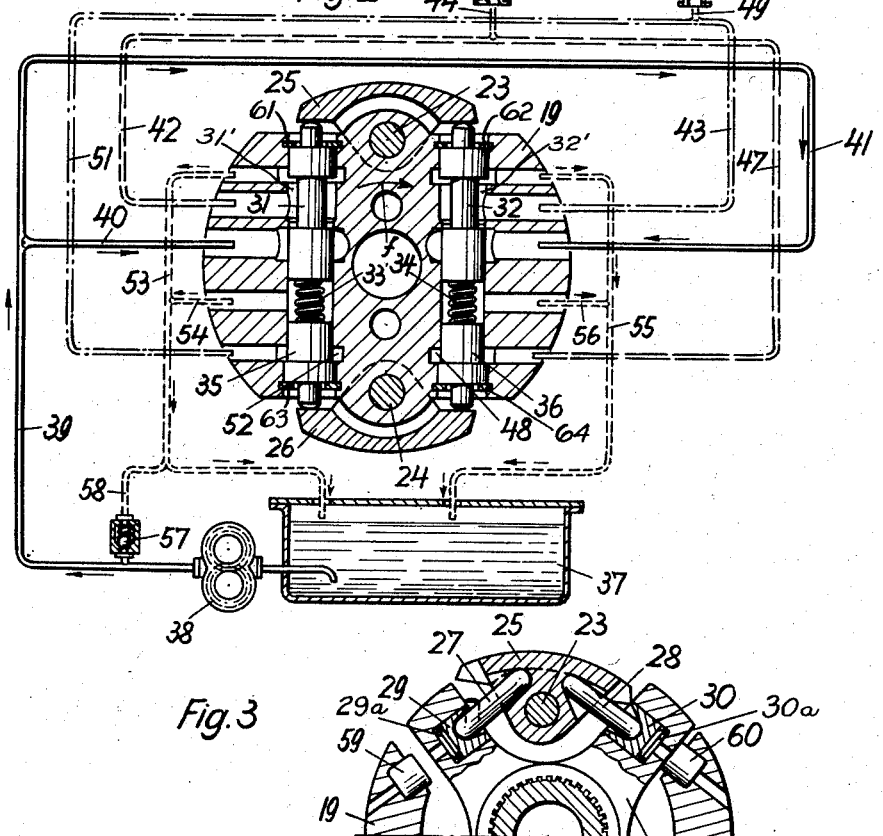
INVENTORS.
HANS-JOACHIM M. FORSTER &
JOSEF A. HELMER.
BY Dicke and Craig.
ATTORNEYS.

United States Patent Office 2,857,976
Patented Oct. 28, 1958

2,857,976

STEERING SERVO MECHANISM, PARTICULARLY FOR MOTOR VEHICLES

Hans Joachim M. Förster, Stuttgart-Bad Cannstatt, and Josef A. Helmer, Stuttgart-Unterturkheim, Germany, assignors to Daimler-Benz Aktiengesellschaft, Stuttgart-Unterturkheim, Germany Application January 26, 1954, Serial No. 406,177
Claim priority, application Germany January 29, 1953
11 Claims. (Cl. 180—79.2)

The present invention relates to a servo-steering mechanism, particularly for motor vehicles.

More particularly, the present invention relates to a servo-mechanism for a steering arrangement for motor vehicles commonly referred to as power steering, in which the steering movement is transmitted from the steering member, such as the steering wheel, to the dirigible vehicle wheels by means of an elastic coupling and which includes a control mechanism responsive to relative movement of the coupled members to actuate and control the auxiliary force which helps the steering movement.

It is, accordingly, an object of the present invention to provide a compact and reliable steering servo-mechanism for motor vehicles.

It is still another object of the present invention to provide a servo-mechanism in connection with the steering mechanism of motor vehicles which is relatively simple in structure and yet extremely reliable in its operation.

A still further object of the present invention is the provision of a servo steering mechanism which is housed within the casing of the steering mechanism and which entails considerable saving of space.

It is a still further object of the present invention to provide a servo steering mechanism which provides the driver with continuous sensation of the size of the auxiliary force used to aid the manual steering effort.

These and other objects and features and advantages of the present invention will become more obvious from the following description when taken in connection with the accompanying drawing which shows for purposes of illustration only one preferred embodiment of the present invention, and wherein:

Figure 1 is a schematic representation of the servo steering mechanism in accordance with the present invention.

Figure 2 is a cross sectional view along line 2—2 of Figure 1 wherein certain parts are shown on an enlarged scale and Figure 3 is a cross sectional view along line 3—3 of Figure 1 showing corresponding parts on the same enlarged scale.

An arrangement of the servo steering mechanism in which the control device is located outside of the parts of the steering mechanism which are coupled with each other, requires special motion transmitting links for the actuation of the control device as well as a separate housing for the same. Such installation is, therefore, expensive and requires relatively large space.

The present invention avoids these disadvantages and essentially consists in that the control mechanism is arranged immediately at one of the coupled steering parts and is displaced in a circumferential direction when the elastic coupling yields, i. e., when relative movement occurs between the coupled parts. Such an arrangement may be realized with simple means and without additional space requirements as will become more obvious from the following description.

Accordingly, the coupling of the present invention comprises one or a plurality of pivotal swinging members supported in one of the steering parts which members support themselves against the other steering part in the pivotal direction in such a manner that they rotate under the influence of a turning moment around their respective rotational axis in the first-named steering part and thereby displace the control members for the auxiliary force which are housed therein.

Furthermore, the present invention contemplates such an arrangement of the control members or spools that they are loaded in opposition to the displacing force by the pressure of the auxiliary force used to produce the servo effect in the manner of reducing valves, preferably with the use of pistons. Thus, the driver always has a sense or feeling of the size of the resistance or for the effective servo force, which is opposed to the turning movement.

Referring now more particularly to the drawing wherein like reference numerals are used throughout the various views thereof to designate like parts, reference numeral 10 designates the dirigible or steerable front wheels of a motor vehicle, which are controlled by means of steering link system 11 which in turn is moved or displaced by steering lever 12.

Steering lever 12 is provided with two lever arms 13 and 13′ which are rigidly fastened to lever 12 for movement therewith around the pivoted support indicated schematically in Figure 1. Lever arm 13 is operatively connected in any suitable manner with a nut 15 which threadably engages a worm gear 16. Nut 15 thereby moves longitudinally, i. e., in the axial direction of the worm gear 16 during rotation thereof. Lever arm 13′ is connected with the piston 14 of the servo mechanism. Axial movement of nut 15 thus causes rotation of lever arm 13, steering lever 12 and lever arm 13′ about their common axis of rotation in the same direction of rotation.

The worm gear 16 is located within the steering mechanism housing 17, and is rigidly connected with a coupling member 18 (see Figures 1 and 3).

A coupling member 19 (Figure 2) corresponds to and cooperates with coupling member 18 of worm gear 16. Coupling member 19 may be rigidly connected with the steering spindle 20 or may be connected therewith by an elastic coupling 21. Coupling member 19, which is connected with the steering wheel 22 by means of spindle 20, is displaced thereby in the rotational direction by manual rotation of steering wheel 22.

Two swinging members 25 and 26 are pivotally supported by means of pivot pins 23 and 24 in coupling part 19 and are also supported against the other coupling part 18 in the rotational direction by means of guide members 27 and 28. The guide members 27 and 28 may be formed as pins which are supported in the swinging members 25 and 26 as well as in the coupling part 18 for universal movement. The pins 27 and 28 are further supported in coupling part 18 by means of sliding members 29 and 30, respectively, which may be made of slightly resilient material and which are spring loaded by spring disk members 29a and 30a.

Furthermore, swinging member 25 abuts against the control spools 31 and 32, as shown in Figure 2, which are housed in bores within coupling member 19 and which support themselves by means of springs 33 and 34 against pistons 35 and 36, which in turn abut against the swinging member 26.

Resilient sealing rings 61, 62, 63 and 64 are provided in the bores of the coupling member 19 to provide resilient sealing and abutment surfaces for the control spools 31 and 32 and for the pistons 35 and 36, respectively.

The control fluid, such as oil, is drawn out of a reservoir 37 and transmitted by means of a pressure pump 38 into a conduit or line 39, which branches out into conduits or lines 40 and 41 which terminate in the cylinders of control spools 31 and 32, respectively. Two conduits or lines 42 and 43 are connected to the upper portions of control cylinders 31' and 32' as viewed in Figure 2 of which the conduit 42 terminates by means of a branch conduit 44 in the left piston-side 45 of the servo piston 14 in servo-cylinder 46. Another branch conduit 37 connects control cylinder 31' with a piston space 48 of the differential piston 36 in such a manner that the pressure, which exists in space 48, exerts a force on the piston 36 in the direction against the swinging member 26.

In a similar manner, the conduit 43 connects control cylinder 32' with the right side 50 of the servo cylinder 46 via branch conduit 49 and with piston space 52 of the differential piston 35 via branch conduit 51. Return conduits 53, 54 or 55 and 56 return the oil to the reservoir 37 from the various parts of the system, conduits 54 and 56 returning such oil as may have found its way past the pistons into the cylinder spaces occupied by springs 33 and 34. A safety valve 57 to protect the system against excess pressure which is provided in line or conduit 58 connects the pressure conduit 39 with one of the afore-mentioned return conduits.

In order to limit the relative movement between the coupling parts 18 and 19, elastic buffers 59 and 60 are provided as illustrated in Figure 3.

*Operation*

With turning of the hand wheel 22, for example, in the direction of the arrow f (see Figure 2) the coupling member 19 is also rotated whereby the swinging member 25 supports itself by means of guiding pin 28 against the coupling part 18 and attempts to turn the worm gear 16 in the same direction of rotation as the steering spindle 20. By reason of the reaction force encountered at pin 28, the swinging member 25 is thereby slightly rotated around its pivot axis 23 in a sense opposite to the direction indicated by the arrow f whereby the control spool 31 is displaced against the effect of spring 33. Displacement of the control spool 31 in the manner described in a downward direction, as viewed in Figure 2, interconnects conduit 40 with conduit 42 through control cylinder 31' whereby oil under pressure passes into conduit 42 from conduit 40 and reaches the left hand side 45 of the servo-mechanism cylinder 46 over conduit 44 and thereby exerts a force to the right on piston 14 as viewed in Figures 1 and 2.

The force exerted on piston 14 is such as to move lever arm 13' in the same rotational direction around the common axis of rotation as that of lever arm 13 caused by rotation of steering wheel 22, spindle 20, coupling parts 19 and 18 and worm gear 16 in the direction of rotation indicated by arrow f. The rotational movement initiated manually by the rotation of the steering wheel 22, is thereby aided at the gear 16 and at the lever 12.

At the same time the pressure prevailing in cylinder space 45 of the servo installation 46, 14 is also effective over line 47 in space 48 and pushes the piston 36 against the swinging member 26. This pressure is noticeable over the coupling member 19 as return pressure at steering wheel 22 so that the driver maintains a feeling for the steering action. The piston 36 thus constitutes a means for sensing the magnitude of the auxiliary force exerted on the vehicle wheels by the servo means 14, 46 and for producing a corresponding feel in the steering spindle 20.

With a steering movement in the direction opposite to that indicated by the arrow f, a corresponding feel is produced in the steering spindle 20 by the piston 35.

The steering spools 31 and 32 thereby operate as reducing valves by providing at the steering wheel a continuous indication on a reduced scale of the instantaneous effect servo force.

The oil inlet may take place, for example, over the steering spindle with the aid of appropriate packings.

We claim:

1. Servo steering mechanism for a motor vehicle having a steering spindle and vehicle wheels, said servo mechanism being operatively connected to said spindle and including relatively movable parts, elastic coupling means between said parts, servo means for producing an auxiliary force, means for transmitting said force to said wheels, control means in said steering mechanism including control slide members operative in response to relative movement of the said parts for controlling the auxiliary force of said servo means, said control slide members being housed within one of said parts, and means supported by one of said parts and movably independent of said slide members for sensing the magnitude of the auxiliary force exerted on said wheels by said servo means and for producing a corresponding feel in said steering spindle.

2. Servo mechanism according to claim 1, wherein said means supported by one of said parts includes piston means.

3. Power steering mechanism for a motor vehicle having a steering spindle and vehicle wheels, said power steering mechanism being operatively connected to said steering spindle and comprising relatively movable parts, resilient coupling means between said parts, servo means for producing an auxiliary force, means for transmitting said auxiliary force to said vehicle wheels, control means in said steering mechanism operated in response to relative movement of the parts coupled by said coupling means for controlling the auxiliary force of said servo means to aid in the steering movement of said wheels initiated by said steering spindle, said control means including a first pivotal swinging member having oppositely directed lever arms and two pistons disposed in bores provided in one of said parts, the lever arms of said swinging member abutting against one end of each of said two pistons, and means for sensing the magnitude of said auxiliary force and for producing a corresponding feel in said steering spindle comprising a second pivotal swinging member having oppositely directed lever arms and two piston members disposed in said bores, the arms of said second pivotal swinging member engaging against one end of each of said two piston members.

4. Power steering mechanism according to claim 3, wherein springs are disposed intermediate said pistons and said piston members.

5. A servo mechanism for a motor vehicle having a pair of dirigible wheels, a steering mechanism for said wheels and a steering spindle, said servo mechanism comprising a primary member connected to said steering spindle, a secondary member transmitting the steering movement from said primary member to said steering mechansm, a servo device actuated by a pressure medium connected to said steering mechanism and operative to adjust said steering mechanism in the direction of said steering movement, means for elastically coupling said primary member with said secondary member to permit relative movement between said two members, adjustable control means in one of said members for controlling the pressure medium of said servo device in response to the relative movement between said two members, and means supported by one of said members for sensing the magnitude of the auxiliary force exerted on said wheels by said servo mechanism and for producing a corresponding feel in said steering spindle.

6. A servo mechanism for a motor vehicle having a pair of dirigible wheels, a steering mechanism for said wheels and a steering spindle, said servo mechanism being operatively connected with said steering spindle and comprising a primary rotatable member, a secondary rotatable member transferring the steering movement from said primary member to said steering mechanism, a servo device actuated by a pressure medium and connected with said steering mechanism, said servo device being operative to adjust said steering mechanism in the direction of said steering movement, means for elastically coupling said primary member with said secondary member including at least one intermediate member and yieldable means for adjustably connecting said intermediate member with one of said two first-mentioned members, means for supporting said intermediate member on the other of said two first-mentioned members, said second-named means being effective to adjust said intermediate member relative to said one of said two first-mentioned members during transfer of rotating torque from one to the other of said two first-mentioned members, and adjustable control means in said one member directly actuated by said intermediate member for controlling the pressure medium for said servo device, conduit means connecting said control means with said servo mechanism, said control means, upon the occurrence of a steering movement initiated by said steering spindle, being adapted to actuate said servo device to aid said last-mentioned steering movement.

7. A servo steering mechanism for motor vehicles comprising a rotatable steering spindle, vehicle wheels, means between said steering spindle and said wheels for transmitting the steering movement from said steering member to said wheels, said means including two relatively movable parts, a swinging means pivotally supported on one of said parts about a pivot axis parallel with the axis of said steering member, and means for movably connecting said swinging means with the other of said parts, servo means for producing an auxiliary force, means for transmitting said force from said servo means to said wheels, and control means in said steering mechanism operated in response to relative movement of said two parts for controlling the auxiliary force of said servo means, said control means comprising control members and said swinging means, said control members being located in said one of said parts, said swinging means being provided with means engaging said control means, and the reaction force encountered by said swinging means at the means for movably connecting said swinging means being effective to rotate said swinging means about said pivot axis to displace one of said control members in response to a turning movement of said steering spindle.

8. Servo mechanism according to claim 7, wherein said swinging means comprises a plurality of oppositely directed arms, said control members are symmetrically disposed, spring-loaded and slidable, and said connecting means includes resilient guide members.

9. A servo mechanism for a motor vehicle having a steering spindle and steerable vehicle wheels, said servo mechanism being operatively connected to said steering spindle and including two rotatable coaxial parts, yieldable coupling means connecting said parts, servo means for producing an auxiliary servo force, means for transmitting said force from said servo means to said wheels, control means carried by one of said coaxial parts and operative in response to relative movement between said parts for controlling the auxiliary force of said servo means, and means carried by said one of said parts and responsive to movement of said yieldable coupling means for sensing the magnitude of the auxiliary force exerted on said wheels and for producing a corresponding feel in said steering spindle.

10. A servo mechanism for a motor vehicle having a pair of dirigible wheels, a steering mechanism for said wheels and a steering spindle, said servo mechanism being operatively connected with said steering spindle and comprising a primary member, a secondary member transmitting the steering movement from said primary member to said steering mechanism, a servo device actuated by a pressure medium connected to said steering mechanism and operative to adjust said steering mechanism in the direction of said steering movement, means for elastically coupling said primary member with said secondary member to permit relative movement between said members, adjustable control means in one of said members for controlling the pressure medium of said servo device in response to the relative movement between said members, and means supported by one of said members for sensing the magnitude of the adjustment of said servo device and for producing a corresponding feel in said steering spindle, said control means including two control spools for said pressure medium adjustable in one of said members, said elastic coupling means including at least one intermediate member resiliently connected with one of said two first-mentioned members and alternately cooperating with said control sleeves to displace the same in either one or the other direction upon movement of said primary member, and said means for sensing including two piston members with means for conducting to said piston members the pressure medium fed to said servo mechanism.

11. A servo mechanism for a motor vehicle having a pair of dirigible wheels, a steering mechanism for said wheels and a steering spindle, said servo mechanism being operatively connected to said steering spindle and comprising a primary rotatable member, a secondary rotatable member transferring the steering movement from said primary member to said steering mechanism, a servo device actuated by a pressure medium and connected with said steering mechanism, said servo mechanism being operative to adjust said steering mechanism in the direction of said steering movement, means for elastically coupling said primary member with said secondary member including at least one intermediate member, means for movably connecting said intermediate member with one of said two first-mentioned members, means for movably connecting said intermediate member with the other of said two first-mentioned members to adjust said intermediate member relative to said one of said two first-mentioned members during transfer of rotating torque from one to the other of said two first-mentioned members, and adjustable control means in said one member for controlling the pressure medium for said servo device, conduit means connecting said control means with said servo device, said control means upon the occurrence of a steering movement initiated by said steering spindle being adapted to actuate said servo mechanism to aid said last-mentioned steering movement, said intermediate member being formed as a two-armed swinging member and being pivotally supported on said one member about an axis substantially parallel to that of said one member, said control means including two control spools adjustably supported in said one member, one of said control spools abutting against one of said arms and the other control spool against the other arm of said swinging member.

References Cited in the file of this patent

UNITED STATES PATENTS

| | | |
|---|---|---|
| 1,748,041 | Backhus | Feb. 18, 1930 |
| 1,981,591 | Edmondson | Nov. 20, 1934 |
| 1,990,530 | Dobson | Feb. 12, 1935 |
| 2,063,937 | Kundig | Dec. 15, 1936 |
| 2,077,747 | Edmondson | Apr. 20, 1937 |
| 2,362,930 | Robbins | Nov. 14, 1944 |
| 2,640,322 | Puerner | June 2, 1953 |
| 2,650,669 | Hammond | Sept. 1, 1953 |
| 2,685,342 | Lauck | Aug. 3, 1954 |

FOREIGN PATENTS

| | | |
|---|---|---|
| 262,324 | Italy | Jan. 23, 1929 |